US012659350B2

(12) United States Patent
Ganesan et al.

(10) Patent No.: US 12,659,350 B2
(45) Date of Patent: Jun. 16, 2026

(54) INDUSTRIAL NETWORK SECURITY POLICY MAPPING AND TRANSLATION

(71) Applicant: Cisco Technology, Inc., San Jose, CA (US)

(72) Inventors: Elango Ganesan, Palo Alto, CA (US); Swapna Anandan, Fremont, CA (US); Akshay Khushu, San Jose, CA (US); Flemming Stig Andreasen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 110 days.

(21) Appl. No.: 18/385,607

(22) Filed: Oct. 31, 2023

(65) Prior Publication Data

US 2025/0141927 A1 May 1, 2025

(51) Int. Cl.
*H04L 9/40* (2022.01)
(52) U.S. Cl.
CPC .................................... *H04L 63/20* (2013.01)
(58) Field of Classification Search
CPC ...................................................... H04L 63/20
USPC ............................................................ 726/1
See application file for complete search history.

(56) References Cited

U.S. PATENT DOCUMENTS

| | | | |
|---|---|---|---|
| 9,781,162 B2 * | 10/2017 | Overby, Jr. ............. | H04L 63/20 |
| 10,243,926 B2 | 3/2019 | Thubert et al. | |
| 10,721,275 B2 * | 7/2020 | Kung ...................... | H04L 63/20 |
| 11,025,590 B1 * | 6/2021 | Kovenat ................. | H04L 63/20 |
| 2016/0381076 A1 | 12/2016 | Kamble et al. | |
| 2017/0295063 A1 | 10/2017 | Yang et al. | |
| 2018/0367563 A1 | 12/2018 | Pfleger De Aguiar et al. | |
| 2021/0352110 A1 | 11/2021 | Huffman et al. | |
| 2021/0409426 A1 * | 12/2021 | Engelberg ............... | H04L 41/22 |
| 2022/0060445 A1 | 2/2022 | Kovenat et al. | |
| 2024/0154970 A1 * | 5/2024 | Cheethirala ........... | H04L 63/101 |
| 2024/0333721 A1 * | 10/2024 | Iqbal ................... | H04L 63/0227 |

* cited by examiner

*Primary Examiner* — Amare F Tabor
(74) *Attorney, Agent, or Firm* — Lee & Hayes, P.C.

(57) ABSTRACT

In one implementation, a method is disclosed comprising: determining, by a process, a network topology of a particular computer network and capabilities of particular devices within the network topology; determining, by the process, a logical framework of the particular computer network; mapping, by the process, access control and segmentation features of the particular devices to the logical framework based on the capabilities of the particular devices; and causing, by the process, mapped access control and segmentation features to be implemented to enforce the logical framework within the network topology.

18 Claims, 16 Drawing Sheets

400

420

ZONE: IT SERVICES

CLOUD SERVICE

ENTERPRISE SERVICE

WEB SERVER

NTP STRATUM

SENSOR

BACKBONE SWITCH

400

400

400

ROCKWELL FACTORY TALK

SIMATIC CONTROLLER

ABB SAFETY CONTROLLER

SENSOR

AGGREGATION SWITCH

SENSOR

ACCESS SWITCH

SENSOR

ACCESS SWITCH

SIEMENS ARM PROC

QUALITY CNTL

ABB PICK PROC

SIEMEN PACK PROC

ROCKWELL ARM PROC

ROCKWELL LOAD PROC

450        ZONE: SITEOPs

400

460                    ZONE: FIXEDAUTO

400

470 ZONE: SUPCONTROL

ROCKWELL FACTORY TALK

FANUC HMI

ENGINEERING WORKSTATION

SENSOR

AGGREGATION SWITCH

SENSOR

ZONE AGGREGATION SWITCH

SENSOR

ACCESS SWITCH

SCARA 3A    DELTA M

VLAN 200 - OFFLOADING

ACCESS SWITCH

PLC    PLC

VLAN 400 - HANDLING

SENSOR

ZONE AGGREGATION SWITCH

SENSOR

ACCESS SWITCH

G0/4    G0/6

METER    SCL    CONTROL

VLAN 100 - PRESSWORKING

SIEMENS SUP CTRL

ROCKWELL CTRL

SIEMENS CTRL

ACCESS SWITCH

PLC    PLC

VLAN 300 - MACHINING

FIG. 4H

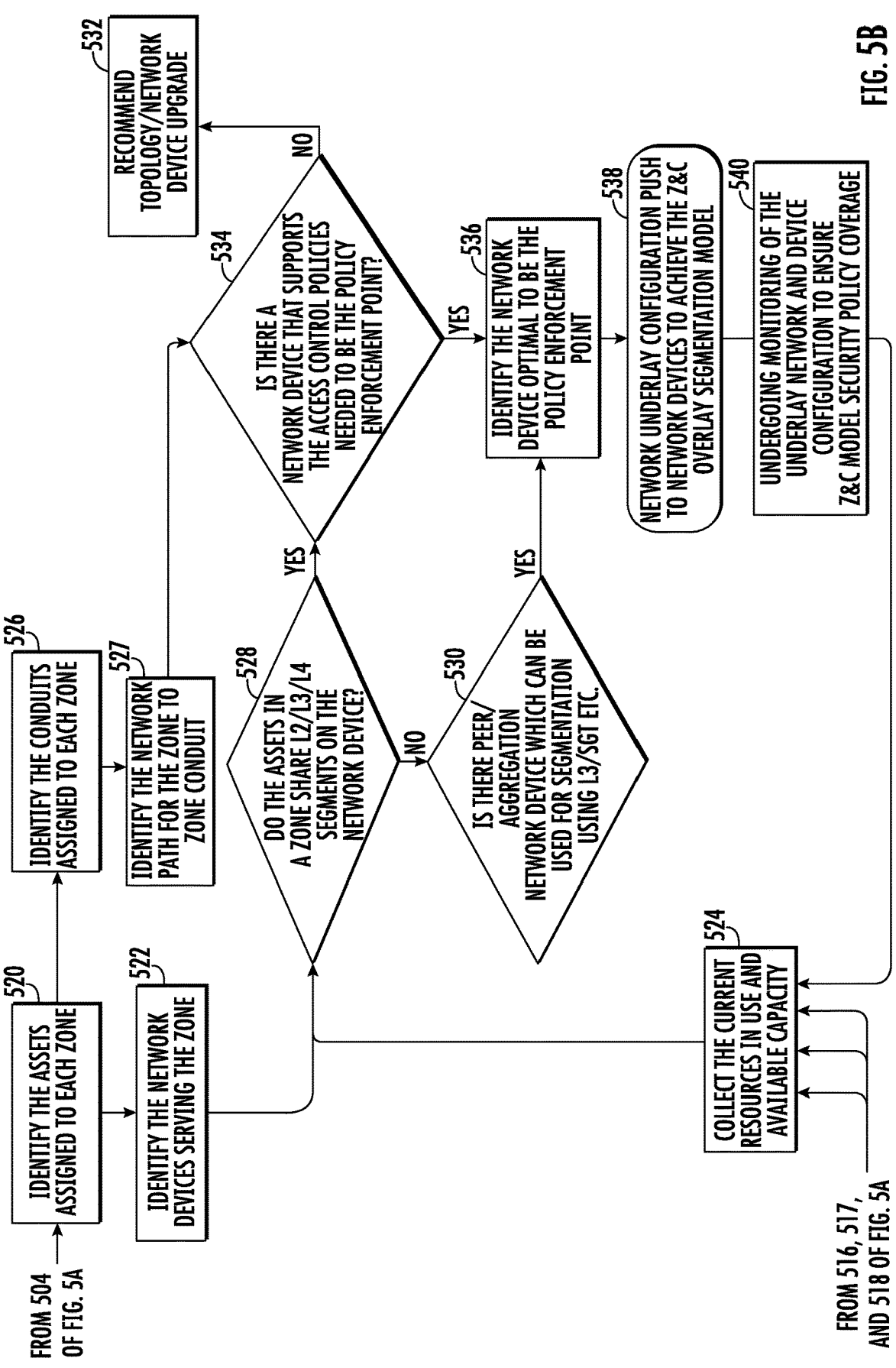

FROM 504
OF FIG. 5A

520 IDENTIFY THE ASSETS ASSIGNED TO EACH ZONE

522 IDENTIFY THE NETWORK DEVICES SERVING THE ZONE

526 IDENTIFY THE CONDUITS ASSIGNED TO EACH ZONE

527 IDENTIFY THE NETWORK PATH FOR THE ZONE TO ZONE CONDUIT

528 DO THE ASSETS IN A ZONE SHARE L2/L3/L4 SEGMENTS ON THE NETWORK DEVICE?

530 IS THERE PEER/AGGREGATION NETWORK DEVICE WHICH CAN BE USED FOR SEGMENTATION USING L3/SGT ETC.

534 IS THERE A NETWORK DEVICE THAT SUPPORTS THE ACCESS CONTROL POLICIES NEEDED TO BE THE POLICY ENFORCEMENT POINT?

532 RECOMMEND TOPOLOGY/NETWORK DEVICE UPGRADE

536 IDENTIFY THE NETWORK DEVICE OPTIMAL TO BE THE POLICY ENFORCEMENT POINT

538 NETWORK UNDERLAY CONFIGURATION PUSH TO NETWORK DEVICES TO ACHIEVE THE Z&C OVERLAY SEGMENTATION MODEL

540 UNDERGOING MONITORING OF THE UNDERLAY NETWORK AND DEVICE CONFIGURATION TO ENSURE Z&C MODEL SECURITY POLICY COVERAGE

524 COLLECT THE CURRENT RESOURCES IN USE AND AVAILABLE CAPACITY

FROM 516, 517, AND 518 OF FIG. 5A

FIG. 5B

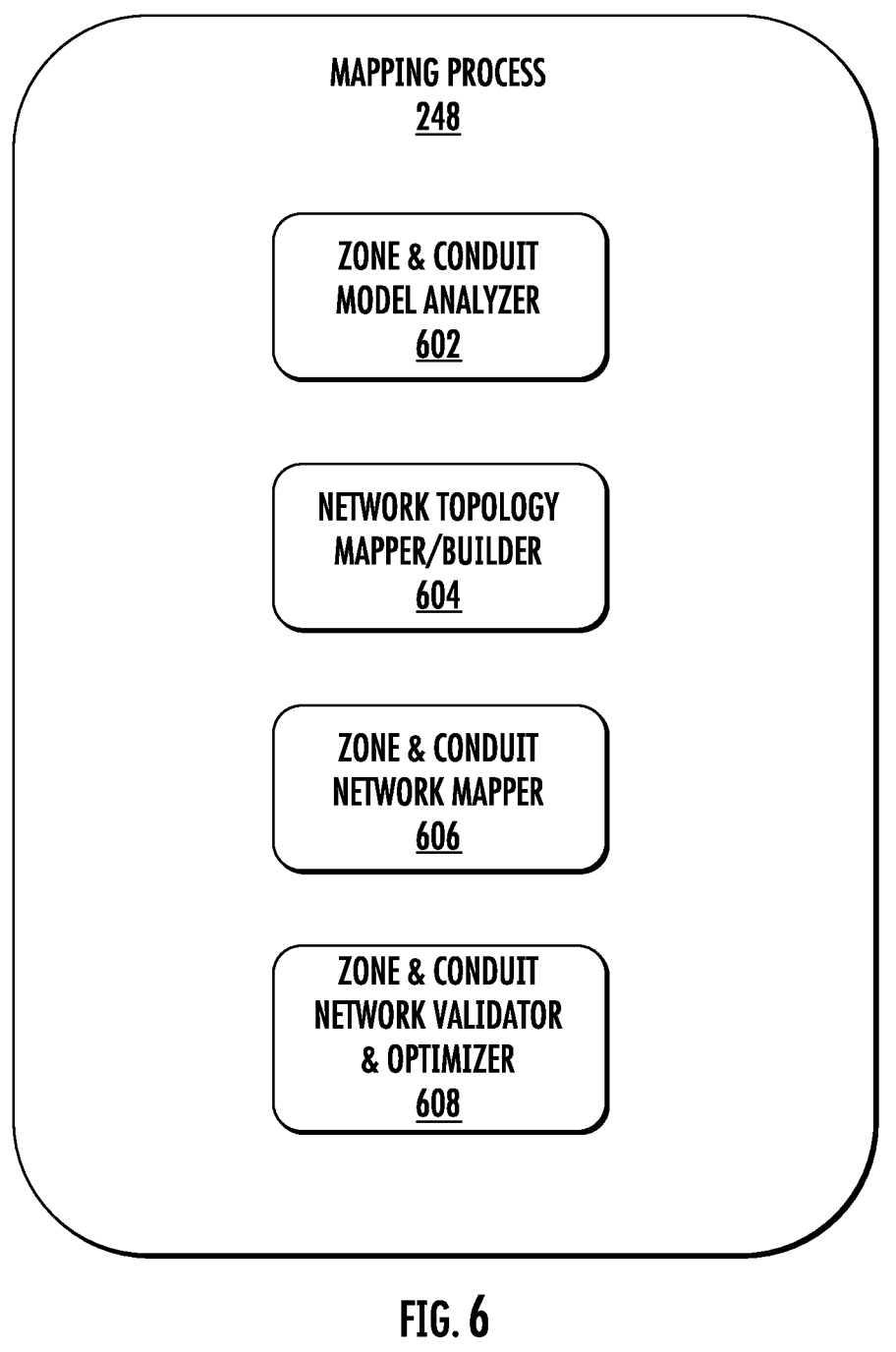

MAPPING PROCESS
248

ZONE & CONDUIT
MODEL ANALYZER
602

NETWORK TOPOLOGY
MAPPER/BUILDER
604

ZONE & CONDUIT
NETWORK MAPPER
606

ZONE & CONDUIT
NETWORK VALIDATOR
& OPTIMIZER
608

FIG. 6

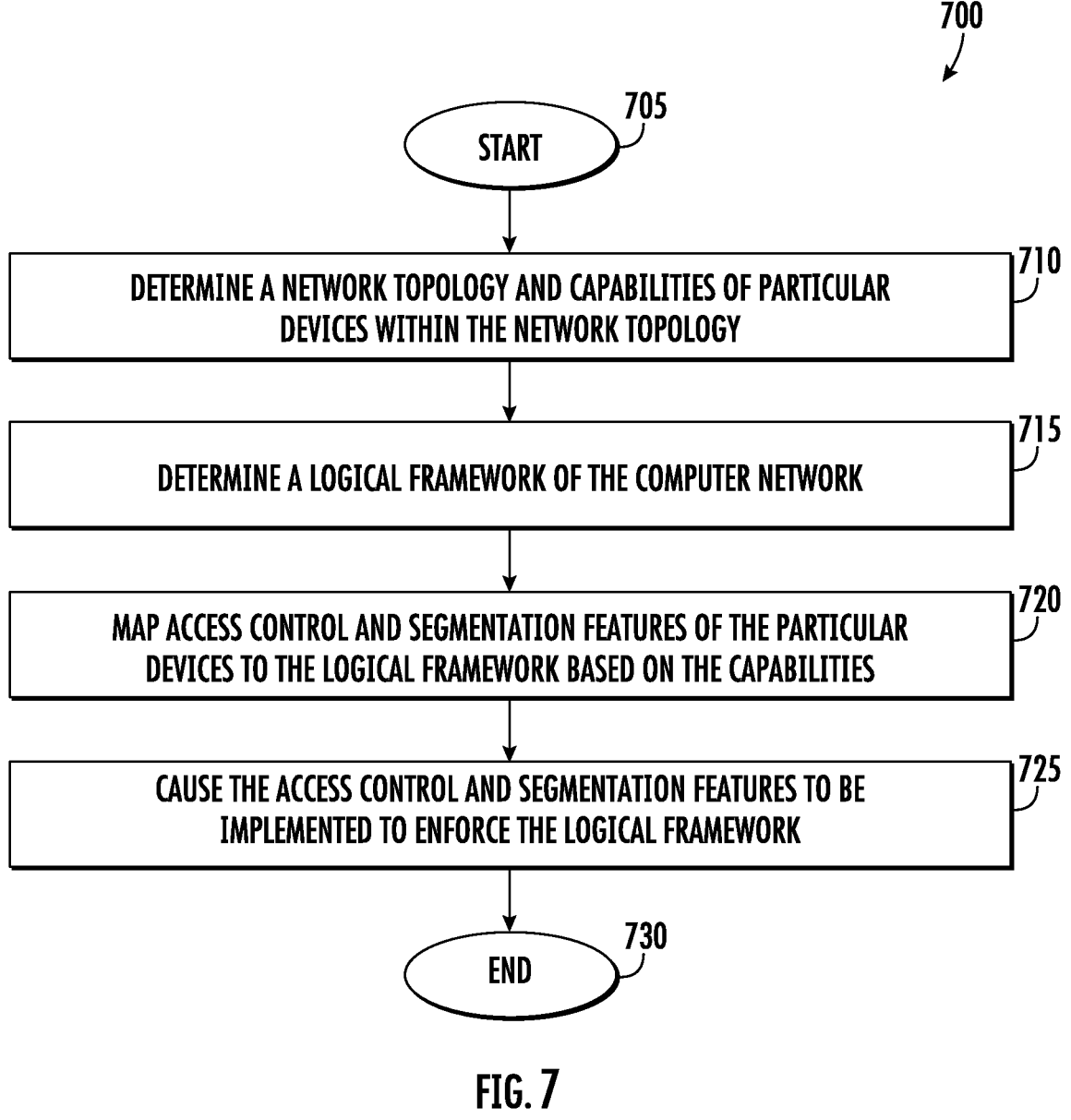

700

705

START

710

DETERMINE A NETWORK TOPOLOGY AND CAPABILITIES OF PARTICULAR
DEVICES WITHIN THE NETWORK TOPOLOGY

715

DETERMINE A LOGICAL FRAMEWORK OF THE COMPUTER NETWORK

720

MAP ACCESS CONTROL AND SEGMENTATION FEATURES OF THE PARTICULAR
DEVICES TO THE LOGICAL FRAMEWORK BASED ON THE CAPABILITIES

725

CAUSE THE ACCESS CONTROL AND SEGMENTATION FEATURES TO BE
IMPLEMENTED TO ENFORCE THE LOGICAL FRAMEWORK

730

END

FIG. 7

INDUSTRIAL NETWORK SECURITY POLICY MAPPING AND TRANSLATION

TECHNICAL FIELD

The present disclosure relates generally to computer networks, and, more particularly, to industrial network security policy mapping and translation.

BACKGROUND

Industrial networks are often built on the International Society of Automation (ISA) standards, such as the Purdue Model, which defines the best practices for the relationship between industrial control systems and business networks. The Purdue Model defines the reference model to create a boundary between the Information Technology (IT) portion of the network and the Operational Technology (OT) portion of the network at a Demilitarized Zone (DMZ), with the OT portion of the network divided into side-wide supervisory systems, local supervisory systems, and local controllers in charge of a process, cell, or line. At the lowest levels of the model are the sensors and actuators for that cell, line, or process.

Currently there is no well-defined method to generate a mapping of a logical model (e.g., the zones and conduit model introduced by the ISA/IEC 62443 series of standards, etc.) to the underlying network infrastructure, let alone providing an optimized mapping. For example, the prevalent zone and conduit-based model is deployed simply by introducing perimeter firewalls on the network boundaries without leveraging the optimal capabilities on all the network infrastructure devices and the network topology. As a result, the structuring, utilization, and performance of these industrial networks and their constituent components remain suboptimal.

BRIEF DESCRIPTION OF THE DRAWINGS

The implementations herein may be better understood by referring to the following description in conjunction with the accompanying drawings in which like reference numerals indicate identically or functionally similar elements, of which:

FIGS. 4A-4H illustrate an example of a process for modeling an optimized network configuration for an underlying physical topology;

FIGS. 5A-5B illustrate an example of a process flow for optimized logical model deployment;

FIG. 6 illustrates an example of an architecture for industrial network security policy mapping and translation; and FIG. 7 illustrates an example simplified procedure for industrial network security policy mapping and translation.

DESCRIPTION OF EXAMPLE EMBODIMENTS

Overview

Figure 1A:
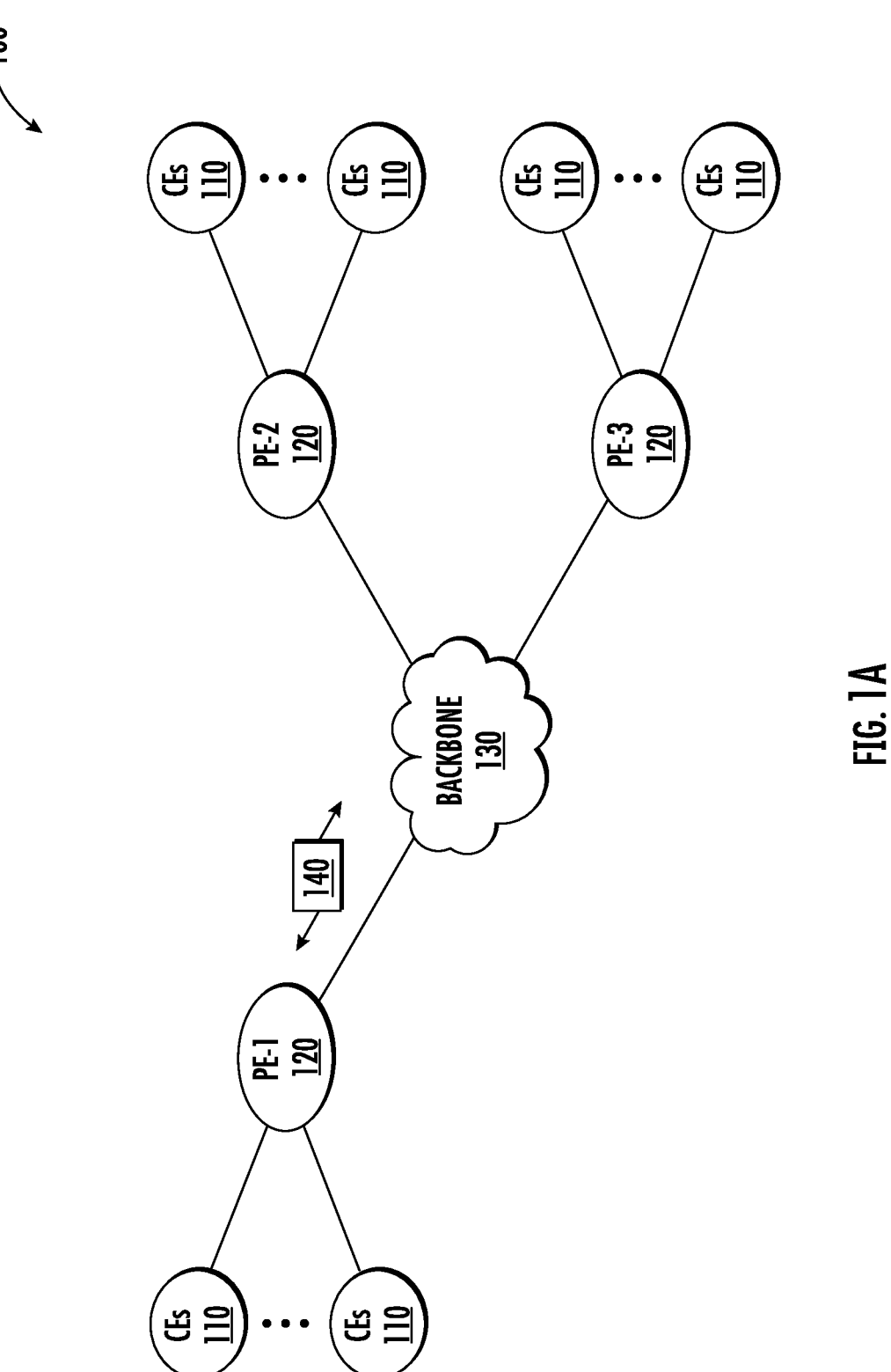
FIGS. 1A-1B illustrate an example communication network.

According to one or more implementations of the disclosure, industrial network security policy mapping and translation is provided. In particular, implementations of techniques herein may be utilized to map access control and segmentation features of devices within a network topology to a logical framework based on capabilities of those devices. Then, the access control and segmentation features may be implemented to enforce the logical framework within the network topology. Utilizing this framework, an industrial network can be automatically configured with security policies derived from a targeted logical model in a manner that is optimized to the topology and capabilities of the underlying network.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example of a computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone (e.g., network backbone 130). For example, routers 110, 120 may be interconnected by the public Internet, a multiprotocol label switching (MPLS) virtual private network (VPN), or the like. Data packets 140 (e.g., traffic/messages) may be exchanged among the nodes/ devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

Figure 1B:
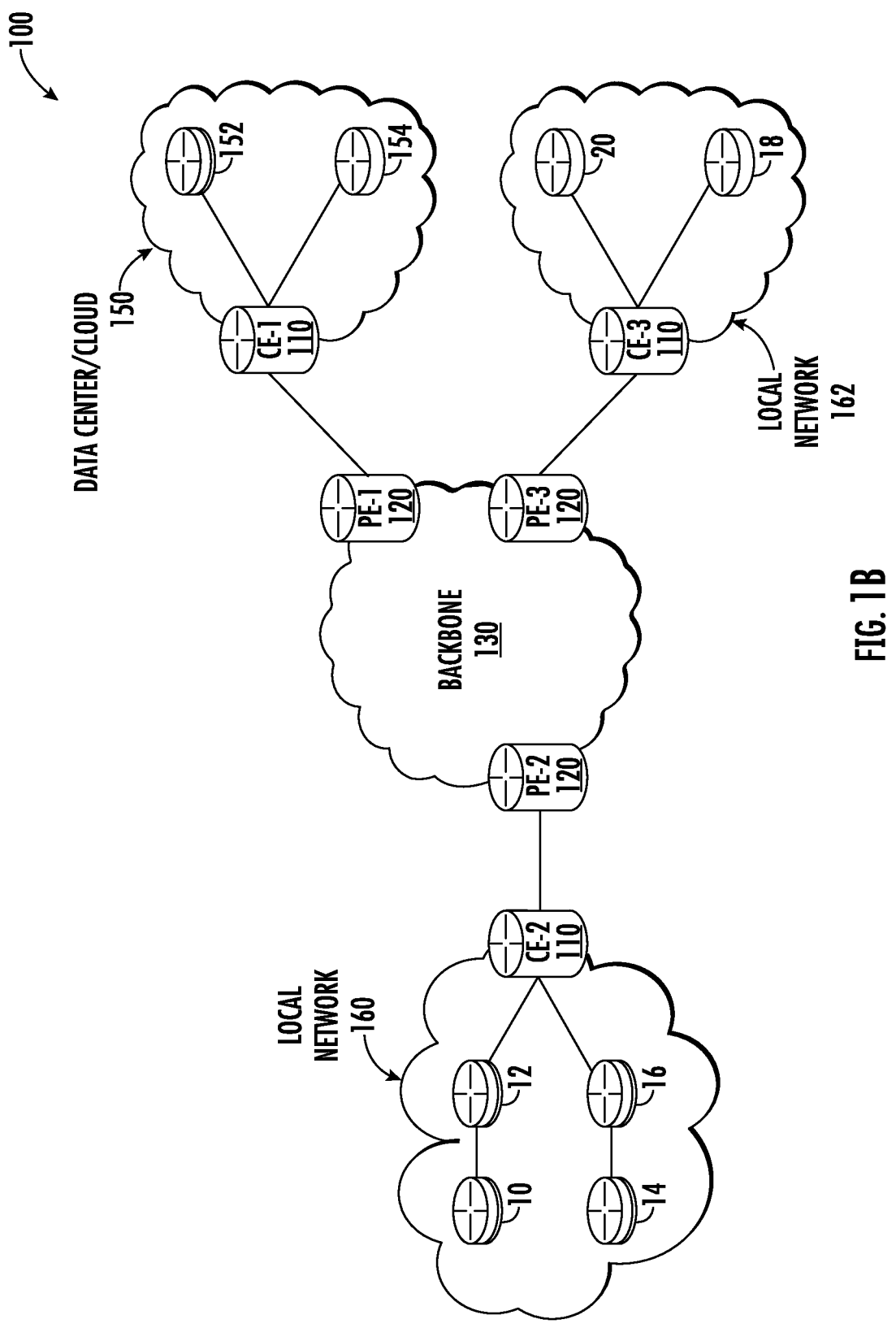

FIG. 1B illustrates an example of computer network 100 in greater detail, according to various implementations. As shown, network backbone 130 may provide connectivity between devices located in different geographical areas and/or different types of local networks. For example, computer network 100 may comprise local/branch networks (e.g., local network 160, local network 162) that include nodes/devices 10-16 and nodes/devices 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, computer network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

In various implementations, computer network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability.

LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some implementations.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QOS), security, network management, and traffic engineering extremely challenging, to mention a few.

Figure 2:
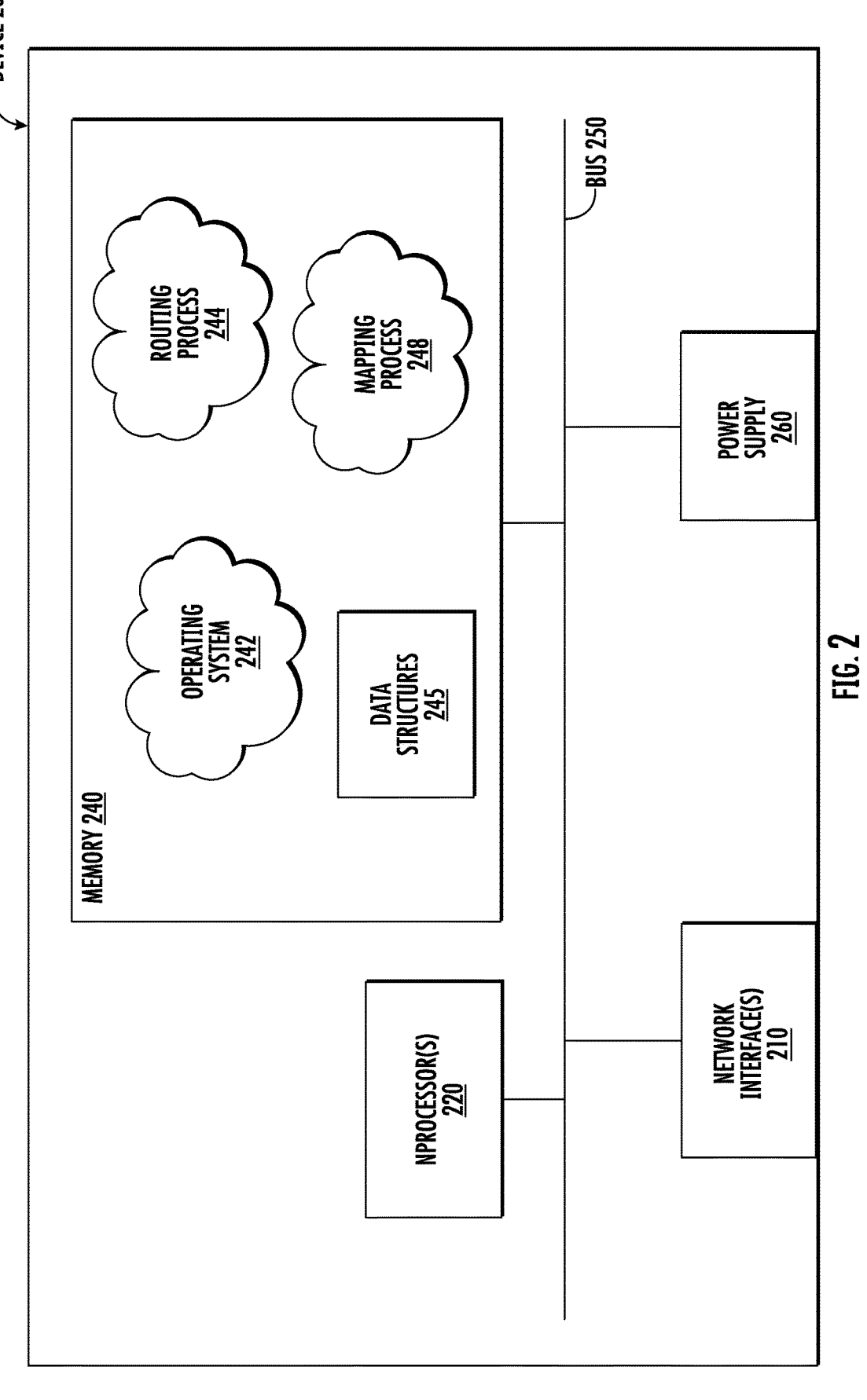
FIG. 2 illustrates an example network device/node.

FIG. 2 is a schematic block diagram of an example node/device 200 that may be used with one or more implementations described herein, e.g., as any of the computing devices shown in FIGS. 1A-1B, particularly the PE routers (e.g., routers 120), CE routers (e.g., routers 110), nodes/ device 10-20, servers 152-154 (e.g., a network controller located in a data center, etc.), any other computing device that supports the operations of computer network 100 (e.g., switches, etc.), or any of the other devices referenced below. The device 200 may also be any other suitable type of device depending upon the type of network architecture in place, such as IoT nodes, etc. Device 200 comprises one or more of the network interfaces 210, one or more of the processor (s) 220, and a memory 240 interconnected by a system bus 250, and is powered by a power supply 260.

The network interfaces 210 include the mechanical, electrical, and signaling circuitry for communicating data over physical links coupled to the computer network 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a mapping process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 include computer executable instructions executed by processor(s) 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers using routing protocols, such as the conventional OSPF and IS-IS link-state protocols (e.g., to "converge" to an identical view of the network topology).

Mapping process 248 includes computer executable instructions that, when executed by processor(s) 220, cause device 200 to perform various operations and/or processes described in more detail in connection with the present disclosure below.

Figure 3:
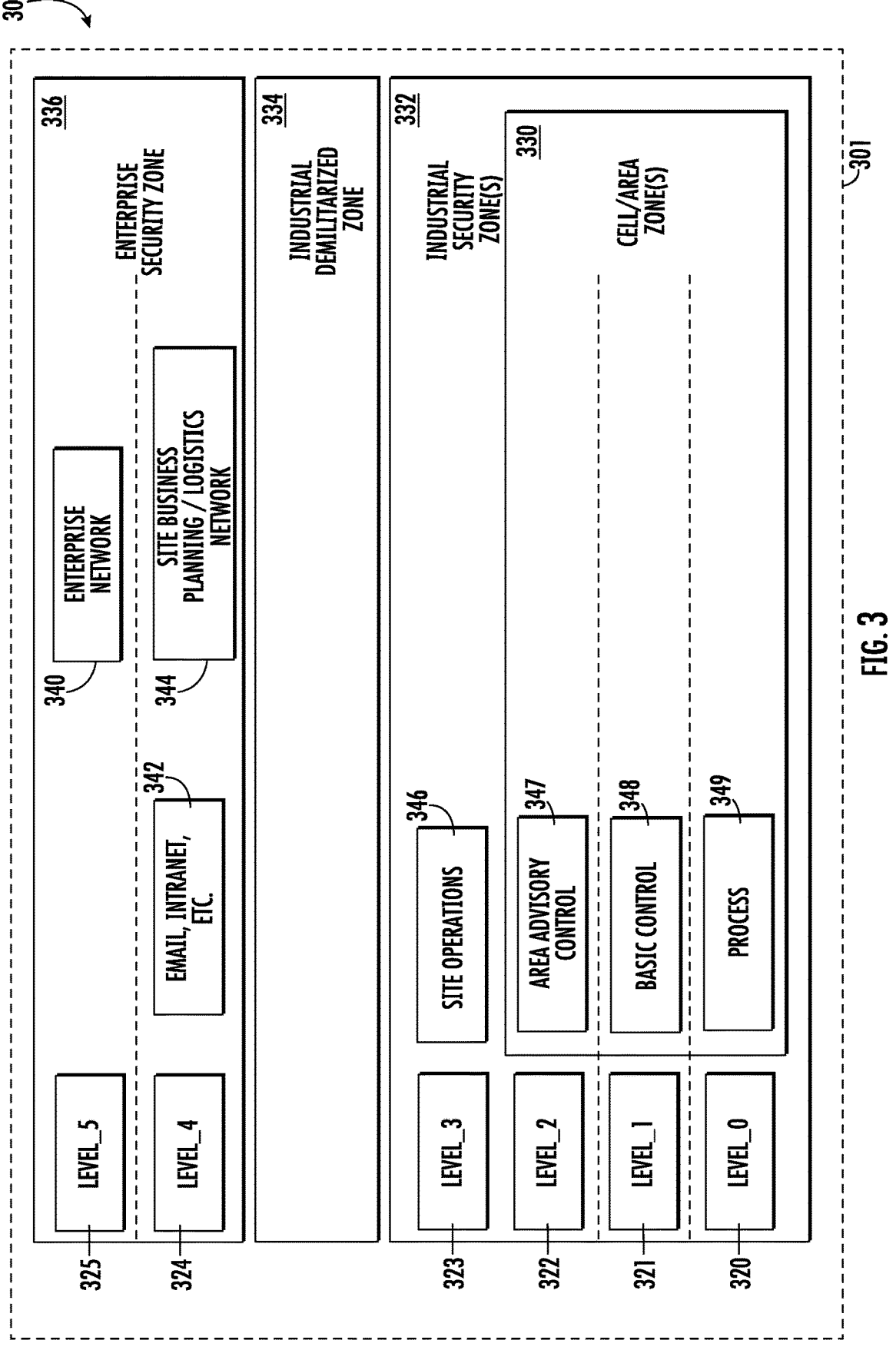
FIG. 3 illustrates an example of a model of an industrial network.

FIG. 3 illustrates an example model 300 of an industrial network 301. As will be appreciated, the example model 300 illustrated in FIG. 3 is a Purdue Model of an industrial network 301; however, it will be appreciated that other industrial network models known or to be developed may be utilized in accordance with the disclosure.

As shown in FIG. 3, the model 300 of the industrial network 301 includes multiple levels that correspond to multiple zones of the model 300. For example, the model 300 includes six levels: Level_0 320, Level_1 321, Level_2 322, Level_3 323, Level_4 324, and Level_5 325 and includes four zones: the Cell/Area Zone(s) 330, the Industrial Security Zone(s) 332, the Industrial Demilitarized Zone (DMZ 334), and the Enterprise Security Zone 336.

Level_0 320 of the example model 300 may be referred to as the process 349 zone (or "physical process zone"). Although not shown so as to not obfuscate the drawing, it will be appreciated that Level_0 320 of the example model 300 contains sensors, actuators, drives, robots, and other machinery that are directly responsible for assembly, lubrication, and other physical processes associated with an industrial network. It will be further appreciated that many modern sensors communicate directly with monitoring software in the cloud via cellular networks.

Level_1 321 of the example model 300 may be referred to as the basic control 348 zone (or "intelligent devices zone"). In general, Level_1 321 contains instruments (e.g., programmable logic controllers (PLCs), remote terminal units (RTUs), etc.) that are configured to send commands to the sensors, actuators, drives, robots, and other machinery of Level_0 320. For example, instruments associated with Level_1 321 may provide batch control, discrete control, drive control, continuous process control, and/or safety control, among other possibilities, to the sensors, actuators, drives, robots, and other machinery of Level_0 320.

Level_2 322 of the example model 300 may be referred to as the area advisory control 347 zone (or "control systems zone") and contains systems that supervise, monitor, and control physical processes. Examples of such systems include supervisory control and data acquisition (SCADA) systems, which oversee and control physical processes, locally or remotely, and aggregates data to send to historians, distributed control systems (DCS), which perform SCADA functions but are usually deployed locally, and/or human-machine interfaces (HMIs), which connect to DCS and PLCs to allow for basic controls and monitoring. For example, Level_2 322 may provide one or more clients (e.g., FactoryTalk® clients) that communicate via an operator interface and/or engineering workstation with the instruments of Level_1 321.

Level_3 323 of the example model 300 may be referred to as the site operations 346 zone (or "manufacturing operations systems zone") and contains customized operational technology (OT) devices that manage production workflows on the shop floor. Examples of such devices include manufacturing operations management (MOM) systems to manage production operations, manufacturing execution systems (MES) to collect real-time data to help optimize production, and/or data historians to store process data and/or perform contextual analysis. For example, Level_3 323 may include one or more FactoryTalk® applications servers, FactoryTalk® directories, engineering workstations, and/or remote access servers to manage production workflows on the shop floor.

The Industrial Demilitarized Zone (DMZ 334), which is sometimes referred to as "Level_3.5" of the example model 300 includes security systems such as firewalls and proxies that are used in an effort to prevent lateral threat movement between information technology (IT), which is described in more detail below, and OT. For example, the DMZ 334 may include one or more remote gateway services, application mirrors, patch management systems, web service operations systems, reverse proxies, antivirus servers, etc. to prevent lateral threat movement between IT and OT.

Level_4 324 and Level_5 325 of the example model 300 are located in the Enterprise Security Zone 336, which houses a typical IT network. As will be appreciated, the Enterprise Security Zone 336 is where the primary business functions occur, including the orchestration of manufacturing operations. Enterprise resource planning (ERP) systems here drive plant production schedules, material use, shipping, and inventory levels. For example, Level_4 324 may include a site planning/logistics network 344 and various servers to provide email, intranet, etc. (as shown at box 342), while Level_5 325 may include an enterprise network 340. Although not explicitly shown in FIG. 3, Level_4 324 and/or Level_5 325 may include personal computers, web servers, mail servers, and/or domain name system (DNS) servers.

—Industrial Network Security Policy Mapping and Translation—

As noted above, the prevalent zone (e.g., a grouping of cyber assets that share the same cybersecurity requirements) and conduit (e.g., a grouping of cyber assets dedicated to communications between zones) based model is deployed by introducing perimeter firewalls on the network boundaries without leveraging the optimal capabilities on all the network infrastructure devices and the network topology.

In contrast, the techniques herein leverage knowledge of the network infrastructure itself to generate an optimized mapping with the zones and conduit (or other logical architectures) policies mapped to the underlying network infrastructure. The mapping may be optimized to the underlying network infrastructure through consideration of the network topology, the capabilities of each of the network devices in the network topology, the resources available (CPU, memory, TCAM, etc.) in each of those network devices, etc.

Illustratively, the techniques described herein may be performed by hardware, software, and/or firmware, such as in accordance with the mapping process 248, which may include computer executable instructions executed by the processor(s) 220 (or independent processor of the network interfaces 210) to perform functions relating to the techniques described herein, e.g., in conjunction with routing process 244 or collaboratively with other processes on other devices, and so on.

Specifically, according to one or more implementations of the disclosure, a method is disclosed comprising: determining, by a process, a network topology of a particular computer network and capabilities of particular devices within the network topology; determining, by the process, a logical framework of the particular computer network; mapping, by the process, access control and segmentation features of the particular devices to the logical framework based on the capabilities of the particular devices; and causing, by the process, mapped access control and segmentation features to be implemented to enforce the logical framework within the network topology.

Operationally, and according to various implementations, FIGS. 4A-4H illustrate an example of a process 400 for modeling an optimized network configuration for an underlying physical topology, in accordance with one or more implementations described herein. The process 400 may provide an optimized configuration of underlying network infrastructure to achieve the logical group-based segments, defined by zones, and secure communication policies, defined by conduits, whose implementation facilitates the desired cybersecurity outcome for the industrial operational technology (OT) network.

Figure 4A:
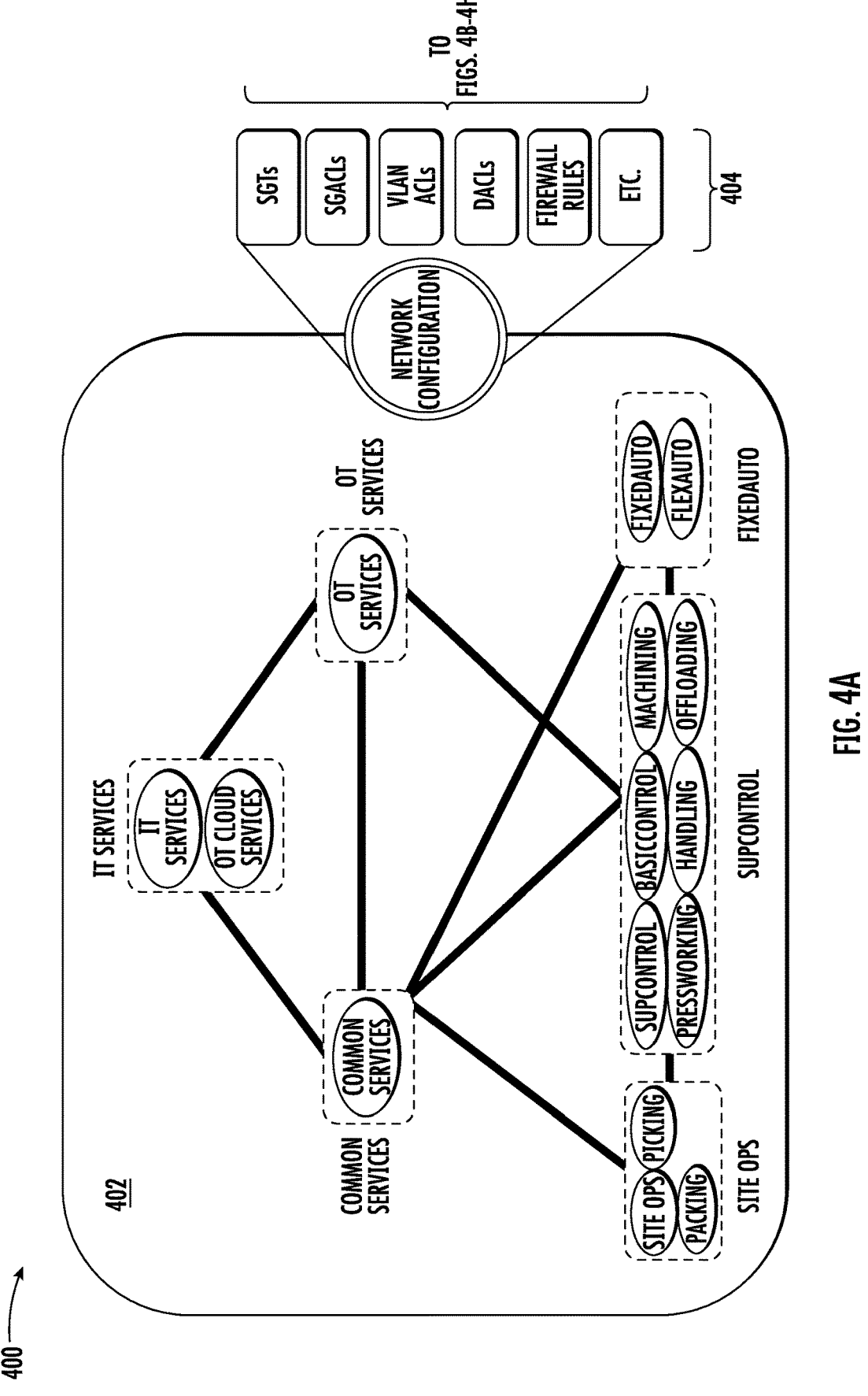
Figure 4B:
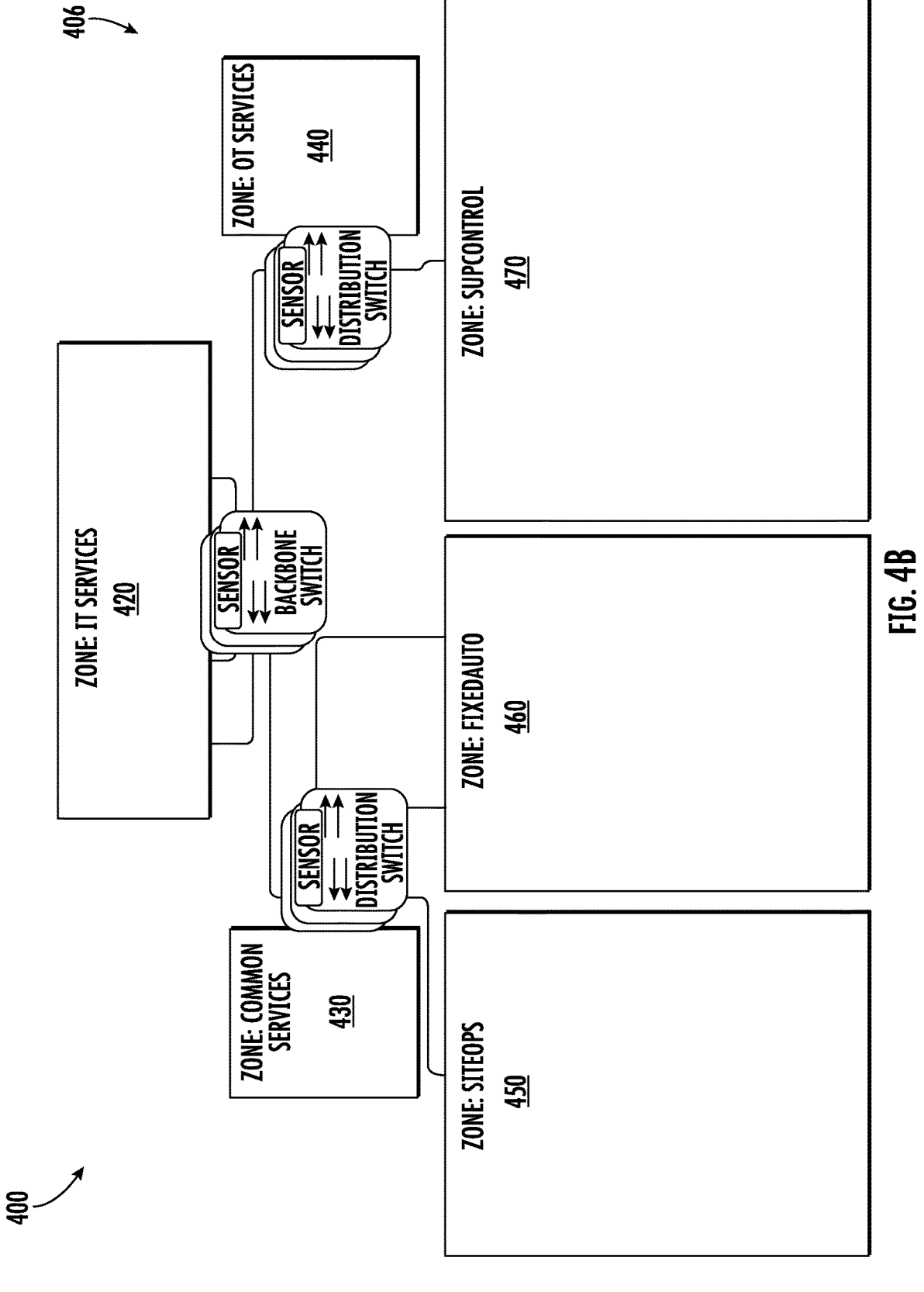
Figure 4C:
Figure 4D:
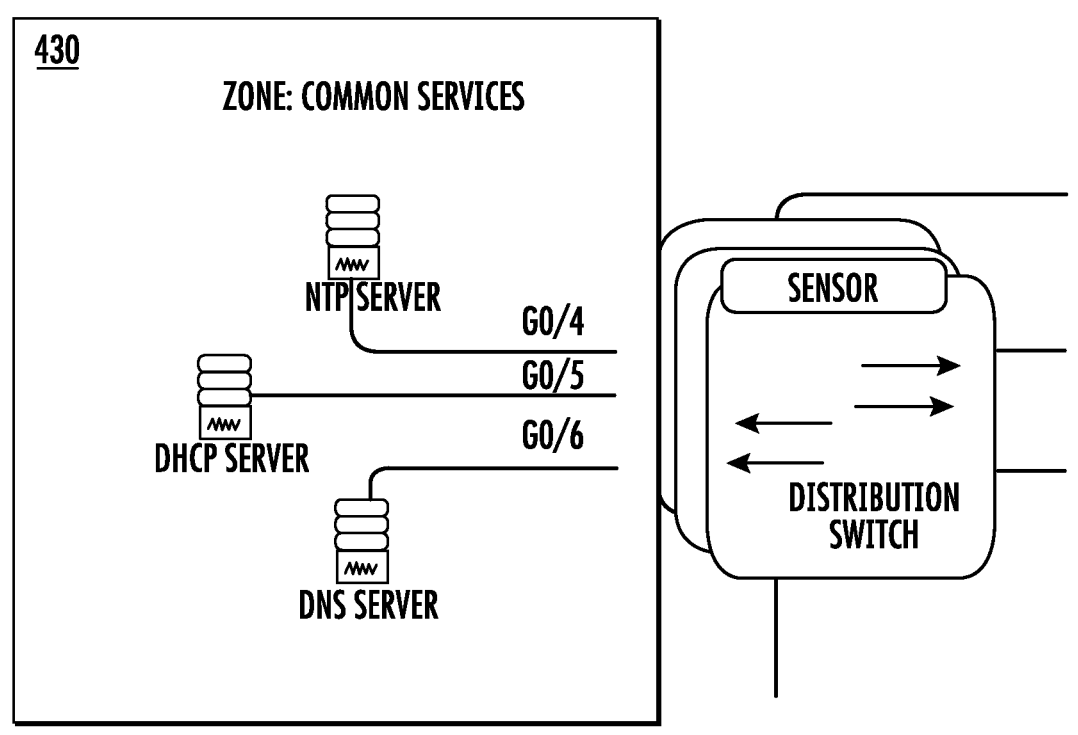
Figure 4E:
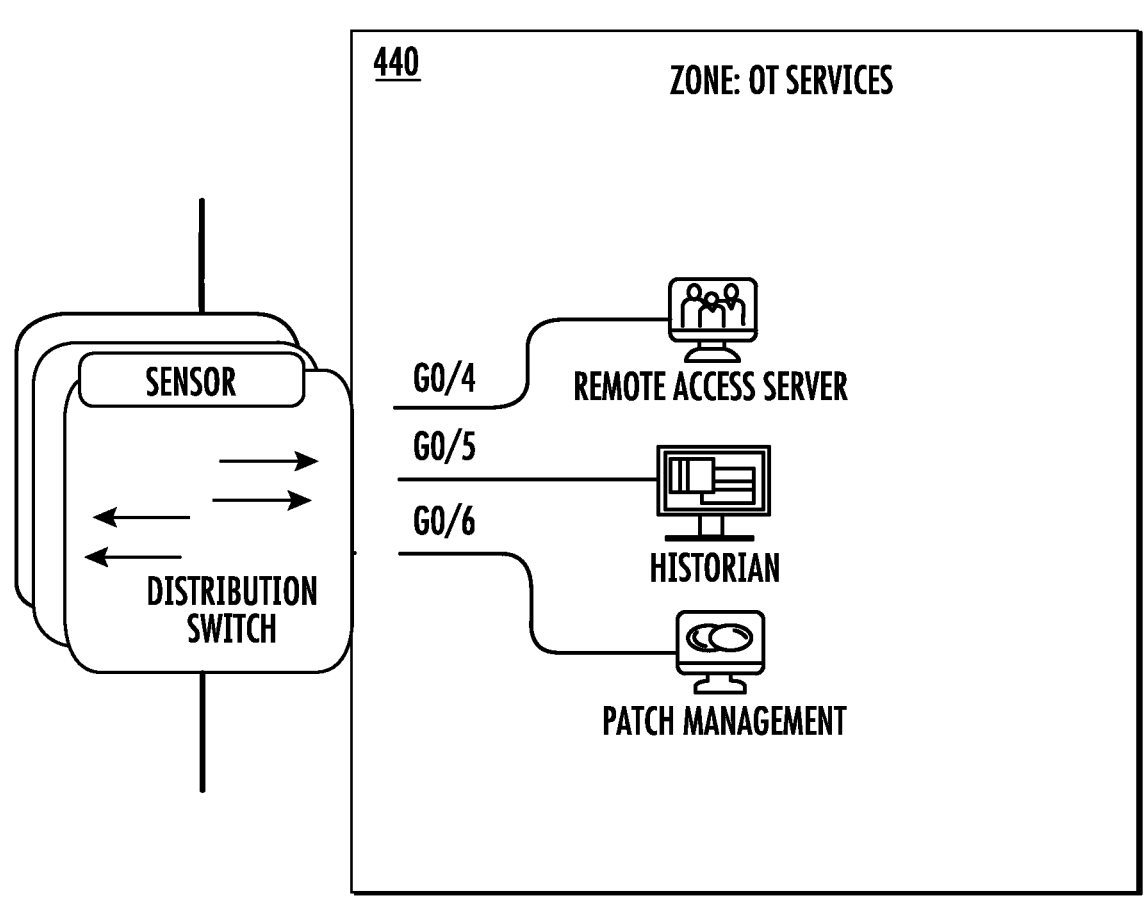
Figure 4F:
Figure 4G:
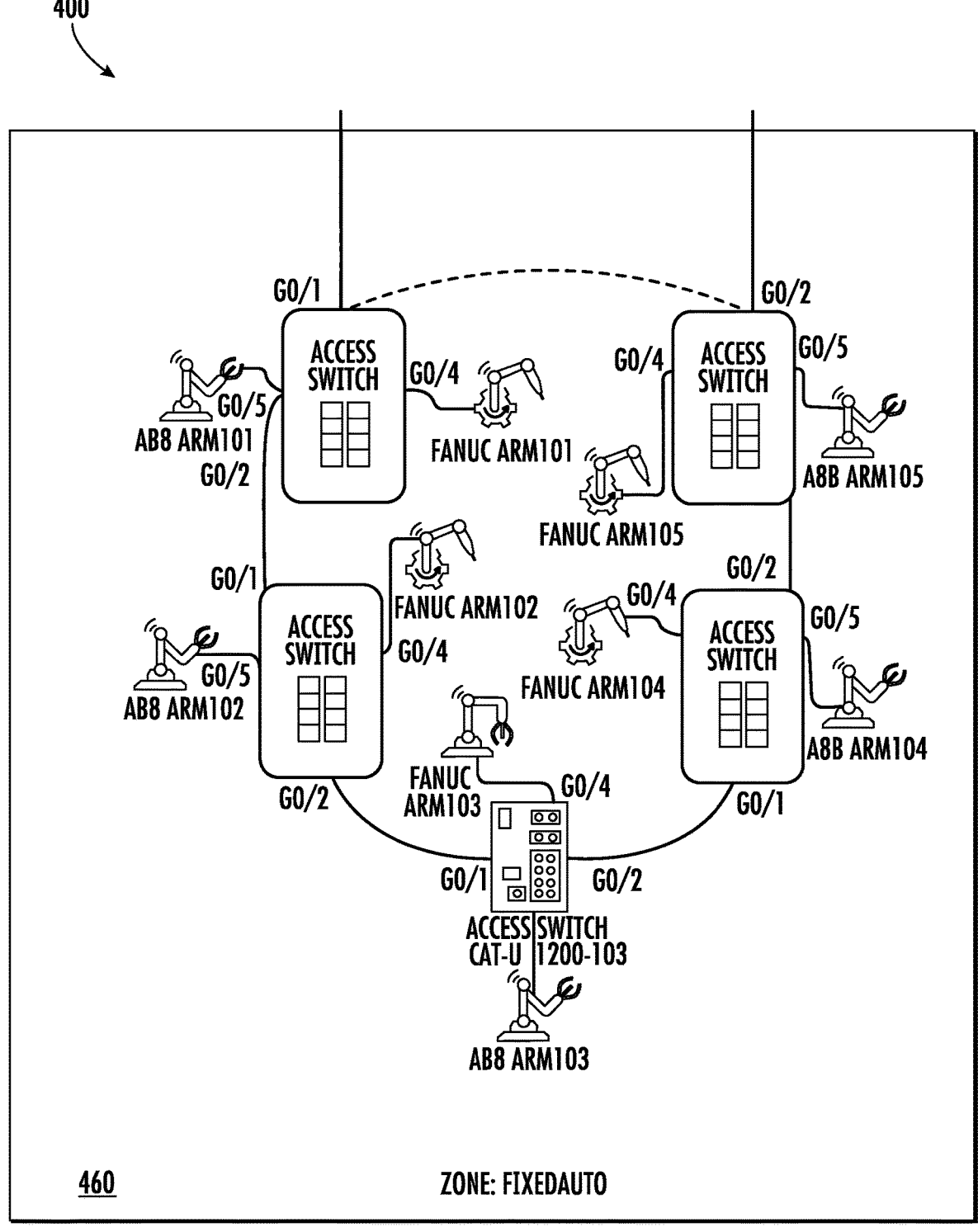

For instance, process 400 may be utilized to develop and implement a logical mapping 402 to apply to a network infrastructure 406, as shown in FIG. 4B, and as shown in illustrative detail in FIGS. 4C-4H. For example, illustrative zones as shown may include IT services 420, common services 430, OT services 440, SiteOps 450, FixedAuto 460, and SUPControl 470, as may be appreciated by those skilled in the art.

Developing the logical mapping 402 may include mapping logical asset groupings (e.g., zones) to specific underlying network technologies supported (e.g., Virtual Local Area Networks (VLANs), Internet Protocol (IP)-address ranges, etc.), while noting that not all technologies may be supported equally in all parts of the network. A combination of technologies may be utilized for mapping the logical asset groupings to the underlying network technologies in some cases.

In addition, developing the logical mapping 402 may include mapping conduit policies to underlying network topologies supported, while noting that a given set of policies (e.g., conduit) for a given set of assets (e.g., zone) may involve a variety of different network infrastructure assets and technologies. A combination of these may be utilized in some cases.

Process 400 may include determining the feasibility of implementing a given logical framework model (e.g., an IEC-62443 zone and conduit model) on top of a network infrastructure 406. This determination may be based on consideration of the network infrastructure characteristics 404 such as technical features (e.g., VLANs, IP Access Control Lists (ACLs), group-based policies, etc.) provided by the different network infrastructure elements, the resources required to support them (Central Processing Unit (CPU), memory, Ternary Content-Addressable Memory (TCAM)), and/or the actual network topology. If a given logical framework model cannot be implemented on the network infrastructure 406 (e.g., configuring the underlying network infrastructure in accordance with the zones and conduits defined is not feasible), then changes to the network infrastructure 406 may be proposed that would enable it to be supported.

To achieve development and implementation of a logical mapping 402 to be applied to a network infrastructure 406, process 400 may involve conducting a discovery of the network infrastructure characteristics 404 of network infrastructure 406. For example, all the network elements (routers, switches, firewalls, etc.) in the underlying infrastructure may be discovered. In addition, the technical features provided by each of these elements to support zones and conduits (e.g., VLANs, IP ACLs, group-based policies, etc.) may be determined. Further, the resource capabilities of each of the network elements may be determined.

Process 400 may further include discovery of the network topology for all of these network elements as well as all the operational technology (OT) assets. For each group of assets (e.g., each zone) and each conduit, various determinations may be made. For example, the networking technology that can be used to place the assets in the same group (e.g., VLAN, IP-address range, group tag, etc.) may be determined based on the network topology and infrastructure capabilities. Further, the place(s) in the network where security (e.g., conduit) policies for all the assets in the group (e.g., all assets belonging to that zone) can be enforced may be determined. Furthermore, for each of the possible combinations of determined network technologies and places in the network for enforcement, a determination of the resulting resource use on the underlying network elements may be made.

These determinations, among others, may inform identification of valid combinations of the determined network technologies and places in the network for enforcement. Each valid combination may then be marked as supportable.

If all asset groups (e.g., zones) and associated conduits can be supported, a check of combined resource usage among all the asset groups and associated conduits may be performed. If the groups and conduits are supportable, then a valid combination may be implemented in the underlying network infrastructure (network infrastructure 406).

Conversely, if the asset groups and conduits are not supportable, then an administrator or other user may be notified which asset groups/conduits cannot be supported and/or which network elements are resource constrained. In some instances, suggestions of possible upgrades to network elements that would remedy supportability may be generated and/or provided to the administrator, as well.

If some asset groups and associated conduits cannot be supported, then, as noted above, an administrator may be notified. Again, the notification may include an indication of the asset groups/conduits that cannot be supported and/or which network elements are resource constrained. Once again, in some instances, suggestions of possible upgrades to network elements that would remedy supportability may be generated and/or provided to the administrator, as well.

Figure 5A:
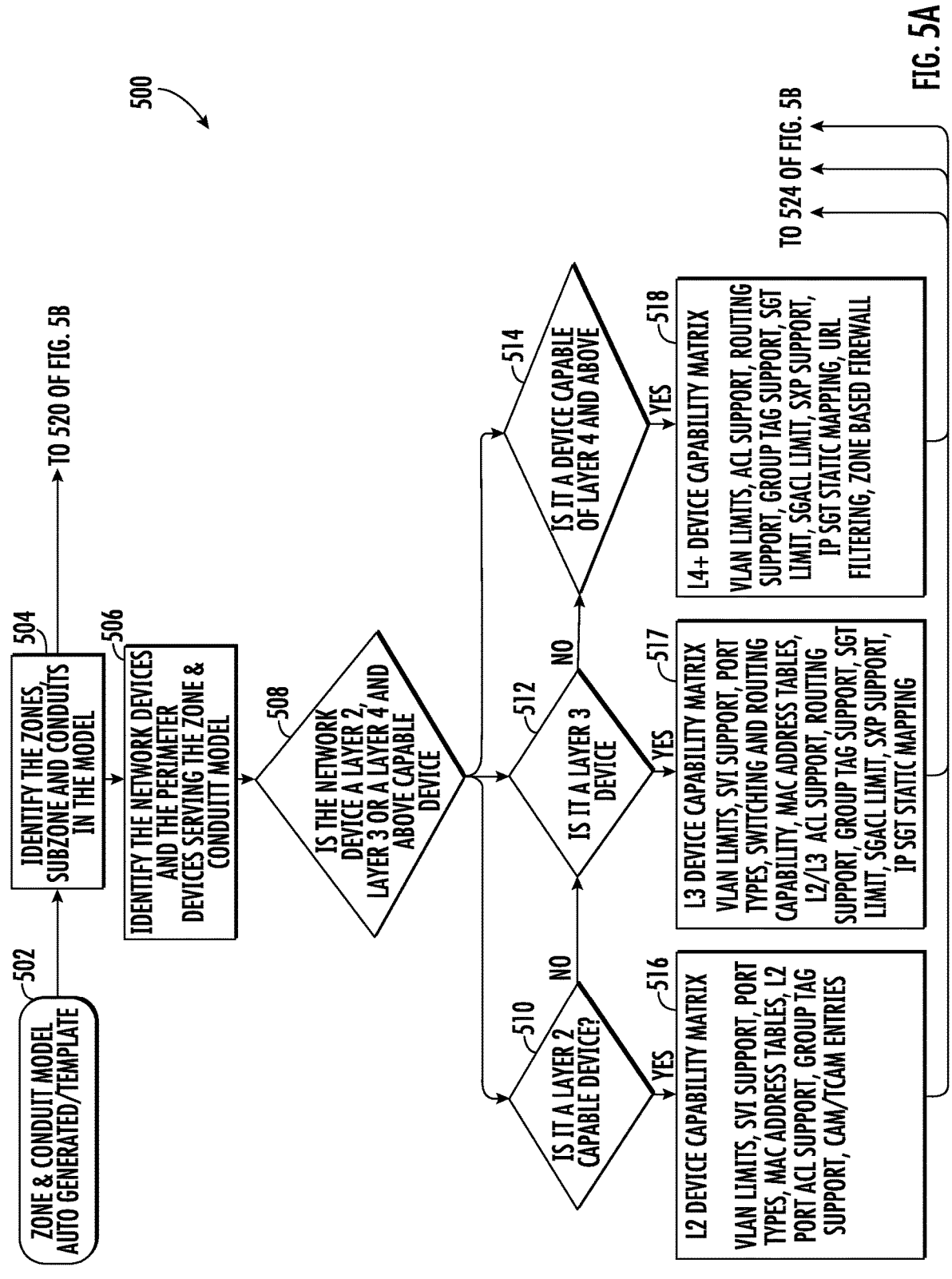

FIGS. 5A-5B illustrate an example of a process flow 500 for optimized logical model deployment, in accordance with one or more implementations described herein. Process flow 500 may comprise a portion of an execution of all or part of the mapping process 248. Process flow 500 may be executed deploy a zone and conduit model 502 (e.g., built by the OT admin manually, built using an automated zone and conduit modeling system to the underlying physical topology, etc.) in the most optimal manner with the ability to gather continuous feedback to improve the model effectiveness with efficiency.

Process flow 500 may proceed to box 504 where the zones, subzones, and/or conduits in the model may be identified. From here, process flow 500 may proceed to box 506 where the network devices and the perimeter devices serving the zone and conduit model may be identified. Then, at box 508, one or more determinations may be made (individually or sequentially) whether a network device is a Layer 2, Layer 3, or a Layer 4 and/or above capable device.

For instance, if at box 510 it is determined that the network device is a Layer 2 capable device, then process flow 500 may proceed to box 516 where a Layer 2 device capability matrix is assembled. The Layer 2 device capability matrix may include VLAN limits, Switched Virtual Interface (SVI) support, port types, Media Access Control (MAC) address tables, Layer 2 port ACL support, group tag support, CAM/TCAM entries, etc. associated with the network device. Alternatively, if at box 510 it is determined that the network device is not a Layer 2 capable device, then process flow 500 may proceed to box 512.

If at box 512 it is determined that the network device is a Layer 3 device, then process flow 500 may proceed to box 517 where a Layer 3 device capability matrix is assembled. The Layer 3 device capability matrix may include VLAN limits, SVI support, port types, switching and routing capability, MAC address tables, Layer 2/Layer 3 ACL support, routing support, group tag support, Security Group Tag (SGT) limit, Security Group Access Control List (SGACL) limit, Security Group Tag Exchange Protocol (SXP) support, IP SGT static mapping, etc. associated with the network device. Alternatively, if at box 512 it is determined that the network device is not a Layer 3 device, then process flow 500 may proceed to box 514.

If at box 514 it is determined that the network device is capable of Layer 4 and/or above, then process flow 500 may proceed to box 518 where a Layer 4+ device capability matrix is assembled. The Layer 4+ device capability matrix may include VLAN limits, ACL support, routing support, group tag support, SGT limit, SGACL limit, SXP support, IP SGT static mapping, Uniform Resource Locator (URL) filtering, zone-based firewall information, etc. associated with the network device.

At box 520, process flow 500 may include identifying the assets assigned to each zone. Then, at box 522 the network devices serving those zones may be identified. Process flow 500 may proceed to box 528 where a determination may be made as to whether the assets in a zone share Layer 2, Layer 3, and/or Layer 4 segments on the network device. The device capability matrix data assembled at box 516, box 517, and/or box 518 may be collected at box 524 and utilized in the determination made at box 528. Moreover, any data associated with the ongoing monitoring of the underlay network and device configuration may additionally be collected at box 524 and utilized in the determination made at box 528.

If, at box 528, it is determined that the assets in a zone do not share Layer 2, Layer 3, and/or Layer 4 segments on the network device, then a further determination may be made at box 530 as to whether these is a peer/aggregation network device which can be used for segmentation using Layer 3/SGT, etc. If yes, then process flow 500 may proceed to box 536 where the network device optimal to be the policy enforcement point is identified (e.g., in this case, the peer/aggregation network device). This determination may be further informed with data regarding conduits and control policies for the zones, etc.

If, at box 528, it is determined that the assets in a zone do share Layer 2, Layer 3, and/or Layer 4 segments on the network device, then a further determination may be made at box 534 as to whether there is a network device that supports the access control policies needed to be the policy enforcement point. If not, then process flow 500 may proceed to box 532 where a topology/network device upgrade that will optimally (e.g., most direct, most efficient, most precisely, most cost effective, etc.) remediate this deficit is determined and/or recommended. If so, then process flow 500 may proceed to box 536 where the optimal network device to serve as the policy enforcement point is identified (e.g., in this case, the network device that supports the requisite access control policies). This determination may be informed by conduits assigned to each zone, as identified in box 526, and/or the network path for the zone-to-zone conduit, as identified in box 527.

Once the network device optimal to serve as the policy enforcement point is identified in box 536, the process flow 500 may proceed to box 538. At box 538, the network underlay configuration identified through iteration of the above outlined steps of the process flow 500 may be pushed to the germane network devices to achieve implementation of the optimized zone and conduit overlay segmentation model. At box 540, ongoing monitoring of the underlay network and device configurations may be conducted to ensure the zone and conduit security policy coverage. The data from this monitoring may be collected at future iterations of box 524 and provided for consideration in future determinations of box 528.

FIG. 6 illustrates an example architecture 600 for industrial network security policy mapping and translation, in accordance with one or more implementations described herein. At the core of architecture 600 is mapping process 248, which may be executed by one or more devices. For example, mapping process 248 may be executed by a network controller, an edge device, an IoT device, an IoT controller, an industrial control system, a computing device, a server, cloud computing resources, etc. In various implementations, mapping process 248 may be executed as a part of and/or in association with an industrial asset/process visibility and/or security management platform involved in network mapping, security, and segmentation which may be deployed within an industrial network.

As shown, mapping process 248 may include zone and conduit model analyzer 602, network topology mapper/builder 604, zone and conduit network mapper 606, and/or zone and conduit network validator and optimizer 608. As would be appreciated, the functionalities of these components may be combined, omitted, segmented, distributed, etc. as desired. In addition, these components may be implemented on a singular device or in a distributed manner, in which case the combination of executing device can be viewed as their own singular device for purposes of executing mapping process 248. When executing, mapping process 248 may facilitate the automatic configuration of an industrial network with security policies derived from an applicable logical overlay model (e.g., an IEC-62443 compliant model) of the network.

For example, when executing, zone and conduit model analyzer 602 may evaluate a logical overlay model. For instance, an IEC-62443 based zone and conduit logical overlay model may be evaluated. The evaluation by the zone and conduit model analyzer 602 may include identification of a number of zones and sub-zones, a number of assets in each zone/sub-zone, communication flows between the assets, etc.

When executing, network topology mapper/builder 604 may connect to available network and communication discovery platforms present on-prem and/or in the cloud. These connections may be leveraged to build a comprehensive physical network topology and activity visualization of connected OT asset details based on a variety of network elements. Network topology mapper/builder 604 may identify each of these elements (e.g., technical features, device capabilities, etc.) in order to build this topology and visualization.

For example, network topology mapper/builder 604 may identify vendor, platform type, data sheet capability matrix, etc. of network devices. Further, network topology mapper/builder 604 may identify the make, model, vendor, and/or the OT assets in the network serving the zones identified by zone and conduit model analyzer 602. Furthermore, network topology mapper/builder 604 may identify support for micro and macro-segmentation capability of each serving network devices such as switches, routers, firewalls etc. in the zone and conduit model. Moreover, network topology mapper/builder 604 may identify support for virtual networks using VLANs and Virtual Routing and Forwarding (VRF) capabilities of each network device.

Additionally, network topology mapper/builder 604 may identify support and limits for access control capabilities such as port ACLs, VLAN ACLs, IP ACLs, dynamic ACLs (dACLs), SG-ACLs, zone-based ACLs and stateful firewall ACLs. Network topology mapper/builder 604 may identify policy-based routing, and identity policies on each serving network device. Further, network topology mapper/builder 604 may identify support and limit of Layer 2 CAM and Layer 3 TCAM. Furthermore, network topology mapper/builder 604 may identify support and limitations of capabilities such as number of VLANs, RIB, FIB entries, etc. Moreover, network topology mapper/builder 604 may identify firmware, OS versions, etc. on the network devices.

Network topology mapper/builder 604 may also collect the traffic demand matrix of ingress-to-egress traffic demands of the zone and conduit model. Network topology mapper/builder 604 may collect IP flow statistics aggregation for the target network underlay, as well. Further, network topology mapper/builder 604 may identify traffic flows between the assets in the overlay model. Furthermore, network topology mapper/builder 604 may identify port status and traffic patterns based on interface port groups that carry control and data traffic for the assets. Moreover, network topology mapper/builder 604 may identify communication interfaces supported on the asset such as Ethernet, Cellular, Wi-Fi, Bluetooth, etc. Network topology mapper/builder 604 may collect and aggregate asset traffic analysis, protocol decoding, and/or packet inspection.

When executing, zone and conduit network mapper 606 may group OT assets to a zone. This grouping may be developed utilizing networking technology (e.g., VLAN, IP-address range, group tag, etc.) derived from network topology and infrastructure capability maps. For example, the grouping may be determined based on conditions such as may be determined from an access switch mapping of a zone which represents a discrete process in the industrial environment such as conveyor belt in an assembly line. If all the OT assets in a zone are connected to an access switch, then ports on the access switch may be assigned to the same VLAN access ports.

The grouping may be determined based on conditions such as may be determined from an access layer mapping. For instance, if assets in a sub-zone within a zone need differentiated security policy assignments, then the ports connected to each sub-zone in a different VLAN may be assigned on the same access switch. Note that the access switch may be a logical (virtual) access switch leveraging overlay technologies on top of one or more underlying physical switches.

Further, the grouping may be determined based on conditions such as may be determined from an aggregation layer 2 mapping. For instance, if the OT assets in an aggregation zone are connected to more than one access switch and all the access switches are aggregated by an aggregation switch, then the assets can be assigned to shared VLANs using the aggregation switch.

Furthermore, the grouping may be determined based on conditions such as may be determined from a distribution route mapping. For instance, if the assets in a zone spread across a distribution switch or a layer 3 router, the assets can be segmented using IP subnets and tags.

Moreover, groupings may be determined from various conduit mapping methods. For instance, by a first conduit mapping method, when the conduits define an access traffic control policy which remains in underlying Layer 2 network, then policies may be implemented using port-based ACLs, VLAN ACLs, and/or security group tags. Dynamic per-port ACLs can be applied for assets within a zone to create sub-zone conduit policies. Using a second conduit mapping method, when the conduit policies cross layer 3 domains for the participating zones, the policies may be implemented using policy-based routing, route-maps, and/or layer 3 and layer 4 ACLs to provide protocol-sensitive and source-sensitive routing policies. Using a third conduit mapping method, when the conduit policy crosses the industrial DMZ, the firewall may be set up with zones to separate the internal traffic and enforce the security policies using zone-based ACLs and stateful firewall ACLs. Similarly, NAT ACL can be configured on edge routers for traffic leaving the industrial networks.

Additionally, when executing, zone and conduit network mapper 606 may group OT assets to a zone based on network traffic patterns. The network traffic patterns may be based on the collected traffic demand matrix of ingress-to-egress traffic demands of the zone and conduit model, the collected flow statistics aggregation for the target network underlay, the identified traffic flows between the assets in the overlay model, the identified port status and traffic patterns, the identified communication interfaces supported on the asset, and/or the collected aggregate asset traffic analysis, protocol decoding, and/or packet inspection from execution of network topology mapper/builder 604.

Zone and conduit network mapper 606 may assign all the OT assets, as per its determined grouping, into sub-zone and zones if the network traffic is staying within the identified network group. Further, zone and conduit network mapper 606 may assign OT assets into a different sub-zone if only a subset of the assets have a unique communication requirement.

Zone and conduit network mapper 606 may determine the place(s) in the network where security (e.g., conduit) policies for all the assets in the group (i.e., all assets belonging to that zone) can be enforced. For each of the possible combinations of networking technologies and places in the network for enforcement, zone and conduit network mapper 606 may determine the resulting resource use on the underlying network elements. Zone and conduit network mapper 606 may mark each valid combination as supportable.

When executing, zone and conduit network validator and optimizer 608 may utilize the mapped dataflow derived from the conduit by zone and conduit network mapper 606 to identify the most optimal network device to be the policy enforcement point. Zone and conduit network validator and optimizer 608 may determine if all asset groups (e.g., zones) and associated conduits can be supported in the underlying network, then combined resource usage may be checked among all the asset groups and associated conduits. If all asset groups and associated conduits are deemed supportable, the network assets to implement a valid combination of security policies may be identified in the underlying network infrastructure utilizing the data from zone and conduit network mapper 606.

If asset groups and associated conduits are deemed not supportable, then a user (e.g., administrator) may be notified which of the asset groups/conduits cannot be supported and/or which of the network elements are resource constrained. In some instances, zone and conduit network validator and optimizer 608 may determine and suggest to the user possible upgrades to remedy the issues underlying the lack of supportability. For example, zone and conduit network validator and optimizer 608 may identify that a particular network device is or is becoming a bottleneck/resource constrained and then point out to an administrator that if they upgraded that device then the targeted policies can be supported.

When low-end access switches do not support a network segmentation and access control framework (e.g., Trustsec by Cisco Systems, Inc.) and/or group-based access control features, enforcement can happen at the aggregation or distribution switch. If there are no network devices in the path capable of enforcing the desired access control, zone and conduit network validator and optimizer 608 may issue a recommendation to update the route path so that the traffic traverses a network device with the ability to enforce, such as a distribution or core switch or perimeter firewall.

If there are multiple network devices where the desired security polices can be enforced, then zone and conduit network validator and optimizer 608 may check the current resource usage such as CAM and TCAM entries, CPU and memory usage, VLAN, ACL, SGT and SGACL limits on the platform to prioritize the network device with the most abundant resources. In various implementations, zone and conduit network validator and optimizer 608 may be configured to choose the farthest aggregation point in the network to enforce the policies as to ensure the polices need not be repeated at multiple access points. Further, zone and conduit network validator and optimizer 608 may prepare backup options using the discovered options in case of failure of the current enforcement point.

Zone and conduit network validator and optimizer 608 may also cause ongoing monitoring of the network to be conducted for enforcement optimization. For example, the underlying network may be continuously monitored to gather telemetry data as per the targeted conduit policies.

If an updated optimal path or enforcement point is identified, zone and conduit network validator and optimizer 608 may propose an updated policy based on the participating zones and conduits. In this manner, the network may be continuously optimized to adapt to changes in traffic, resource consumption, device capabilities/capacity, etc. An administrator can choose to accept the optimized proposal or differ for further monitoring.

In addition, zone and conduit network validator and optimizer 608 may monitor the access control hit counts to ensure granularity of the ACLs and routing policies. In various implementations, if there is a network device malfunction, then zone and conduit network validator and optimizer 608 may ensure the conduit policy is applied via another network device to ensure enforcement continuity.

FIG. 7 illustrates an example simplified procedure for industrial network security policy mapping and translation in a network in accordance with one or more implementations described herein. For example, a non-generic, specifically configured device (e.g., device 200) may perform procedure 700 by executing stored instructions (e.g., mapping process 248).

Procedure 700 may start at step 705, and continues to step 710, where, as described in greater detail above, a network topology of a particular computer network may be determined. In addition, the capabilities of particular devices within the network topology may be determined. The particular computer network may comprise an industrial network.

Determining the capabilities of the particular devices within the network topology may include determining one or more technical features provided by the particular devices. The technical features may include virtual local area network (VLAN) enforcement, access control list (ACL) enforcement, and/or group-based policy enforcement for access control.

In various implementations, determining the capabilities of the particular devices within the network topology may include determining one or more resources of the particular devices. The resources may include central processing unit processing capacity, memory, and/or ternary content-addressable memory.

Determining the network topology may include discovering network elements and operational technology devices within the network topology.

At step 715, a logical framework of the particular computer network may be determined. The logical framework may be based on a model according to an IEC-62443 standard.

As detailed above, at step 720 access control and segmentation features of the particular devices may be mapped to the logical framework based on the capabilities of the particular devices. In various implementations, a feasibility of enforcing the logical framework within the network topology using the capabilities of the particular devices may be determined based on a comparison of the capabilities of the particular devices to requirements of the logical framework. Responsive to determining that enforcing the logical framework within the network topology is not feasible, proposed changes to at least one of the network topologies or the particular devices that will enable adequate access control and segmentation features to enforce the logical framework within the network topology may be provided.

A determination may be made, for each grouping of operational technology assets in the network topology, of a networking technology to be used to place operational technology assets into a respective same group based on the network topology and the capabilities of the particular devices. Additionally, a determination may be made, for each grouping of operational technology assets in the network topology, of a location in the network topology where security policies for all operational technology assets in a respective same group can be enforced. Further, a determination may be made, for each grouping of operational technology assets in the network topology, of resource usage loads on underlying network elements of the network topology for each possible combination of a networking technology to place operational technology assets in a respective same group and a location in the network topology where security policies for all the operational technology assets in the respective same group is enforced.

At step 725, as detailed above, a process may cause the access control and segmentation features to be implemented to enforce the logical framework within the network topology. Causing the access control and segmentation features to be implemented may include enforcing a zone and conduit model within the network topology. Additionally, causing the access control and segmentation features to be implemented to enforce the logical framework within the network topology may include generating a proposed configuration for acceptance by a network administrator.

In various implementations, updated mapping for the access control and segmentation features of the particular devices may be maintained. This may include determining a change in the network topology and/or determining an updated mapping for the access control and segmentation features of the particular devices to enforce the logical framework for the change in the network topology.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, provide for the automatic configuration of an industrial network with security policies derived from an IEC-62443 compliant model of the network. This approach leverages the optimal capabilities on all the network infrastructure devices and the network topology to deliver the highest device and network performance in the most efficient and secure manner. In addition, these techniques can develop targeted recommendations to improve device capabilities and network topologies to achieve optimized model goals. As a result, the security and operation of industrial networks and equipment is improved in a targeted way.

According to the implementations herein, an illustrative method herein may comprise: determining, by a process, a network topology of a particular computer network and capabilities of particular devices within the network topology; determining, by the process, a logical framework of the particular computer network; mapping, by the process, access control and segmentation features of the particular devices to the logical framework based on the capabilities of the particular devices; and causing, by the process, mapped access control and segmentation features to be implemented to enforce the logical framework within the network topology.

In one implementation, the logical framework is based on a model according to an IEC-62443 standard. In one implementation, causing the access control and segmentation features to be implemented includes enforcing a zone and conduit model within the network topology. In one implementation, determining the capabilities of the particular devices within the network topology includes determining one or more technical features provided by the particular devices selected from a group consisting of: virtual local area network (VLAN) enforcement; access control list (ACL) enforcement; and group-based policy enforcement for access control. In one implementation, determining the capabilities of the particular devices within the network topology includes determining one or more resources of the particular devices selected from a group consisting of: central processing unit processing capacity; memory; and ternary content-addressable memory.

In one implementation, the method further comprises determining, based on a comparison of the capabilities of the particular devices to requirements of the logical framework, a feasibility of enforcing the logical framework within the network topology using the capabilities of the particular devices. In one implementation, the method further comprises providing, responsive to determining that enforcing the logical framework within the network topology is not feasible, proposed changes to at least one of the network topology or the particular devices that will enable adequate access control and segmentation features to enforce the logical framework within the network topology. In one implementation, determining the network topology includes discovering network elements and operational technology devices within the network topology.

In one implementation, the method further comprises determining, for each grouping of operational technology assets in the network topology, a networking technology to be used to place operational technology assets into a respective same group based on the network topology and the capabilities of the particular devices. In one implementation, the method further comprises determining, for each grouping of operational technology assets in the network topology, a location in the network topology where security policies for all operational technology assets in a respective same group can be enforced. In one implementation, the method further comprises determining, for each grouping of operational technology assets in the network topology, resource usage loads on underlying network elements of the network topology for each possible combination of a networking technology to place operational technology assets in a respective same group and a location in the network topology where security policies for all the operational technology assets in the respective same group is enforced.

In one implementation, causing the access control and segmentation features to be implemented to enforce the logical framework within the network topology comprises generating a proposed configuration for acceptance by a network administrator. In one implementation, the method further comprises determining a change in the network topology; and determining an updated mapping for the access control and segmentation features of the particular devices to enforce the logical framework for the change in the network topology. In one implementation, the particular computer network comprises an industrial network.

According to the implementations herein, an illustrative tangible, non-transitory, computer-readable medium having computer-executable instructions stored thereon that, when executed by a processor on a computer, cause the computer to perform a method comprising: determining a network topology of a particular computer network and capabilities of particular devices within the network topology; determining a logical framework of the particular computer network; mapping access control and segmentation features of the particular devices to the logical framework based on the capabilities of the particular devices; and causing mapped access control and segmentation features to be implemented to enforce the logical framework within the network topology.

According to the implementations herein, an illustrative apparatus comprising: one or more network interfaces to communicate with a network; a processor coupled to the one or more network interfaces and configured to execute one or more processes; and a memory configured to store a process that is executable by the processor, the process, when executed, configured to: determine a network topology of a particular computer network and capabilities of particular devices within the network topology; determine a logical framework of the particular computer network; map access control and segmentation features of the particular devices to the logical framework based on the capabilities of the particular devices; and cause mapped access control and segmentation features to be implemented to enforce the logical framework within the network topology.

While there have been shown and described illustrative implementations that provide for industrial network security policy mapping and translation, it is to be understood that various other adaptations and modifications may be made within the spirit and scope of the implementations herein. For example, while certain implementations are described herein with respect to using certain logical framework models, technical features, device capabilities, etc. for purposes of industrial network security policy mapping and translation, however the logical framework models, technical features, device capabilities, etc. are not so limited and other may be used in other implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method, comprising:
determining, by a process, a network topology of a particular computer network and policy enforcement capabilities of particular devices within the network topology, wherein determining the policy enforcement capabilities includes determining one or more technical features of the particular devices, the one or more technical features including at least one technical feature selected from a group consisting of: virtual local area network (VLAN) enforcement; access control list (ACL) enforcement; and group-based policy enforcement for access control;
determining, by the process, a logical framework of the particular computer network;
mapping, by the process, access control and segmentation features of the particular devices to the logical framework based on the policy enforcement capabilities of the particular devices; and causing, by the process, mapped access control and segmentation features to be implemented to enforce the logical framework within the network topology.

2. The method as in claim 1, wherein the logical framework is based on a model according to an IEC-62443 standard.

3. The method as in claim 1, wherein causing the access control and segmentation features to be implemented includes enforcing a zone and conduit model within the network topology.

4. The method as in claim 1, wherein determining the policy enforcement capabilities of the particular devices within the network topology includes determining one or more resources of the particular devices selected from a group consisting of: central processing unit processing capacity; memory; and ternary content-addressable memory.

5. The method as in claim 1, further comprising:
determining, based on a comparison of the policy enforcement capabilities of the particular devices to requirements of the logical framework, a feasibility of enforcing the logical framework within the network topology using the policy enforcement capabilities of the particular devices.

6. The method as in claim 5, further comprising:
providing, responsive to determining that enforcing the logical framework within the network topology is not feasible, proposed changes to at least one of the network topology or the particular devices that will enable adequate access control and segmentation features to enforce the logical framework within the network topology.

7. The method as in claim 1, wherein determining the network topology includes discovering network elements and operational technology devices within the network topology.

8. The method as in claim 1, further comprising:
determining, for each grouping of operational technology assets in the network topology, a networking technology to be used to place operational technology assets into a respective same group based on the network topology and the policy enforcement capabilities of the particular devices.

9. The method as in claim 1, further comprising:
determining, for each grouping of operational technology assets in the network topology, a location in the network topology where security policies for all operational technology assets in a respective same group can be enforced.

10. The method as in claim 1, further comprising:
determining, for each grouping of operational technology assets in the network topology, resource usage loads on underlying network elements of the network topology for each possible combination of a networking technology to place operational technology assets in a respective same group and a location in the network topology where security policies for all the operational technology assets in the respective same group is enforced.

11. The method as in claim 1, wherein causing the access control and segmentation features to be implemented to enforce the logical framework within the network topology comprises:
generating a proposed configuration for acceptance by a network administrator.

12. The method as in claim 1, further comprising:
determining a change in the network topology; and determining an updated mapping for the access control and the segmentation features of the particular devices to enforce the logical framework for the change in the network topology.

13. The method as in claim 1, wherein the particular computer network comprises an industrial network.

14. A tangible, non-transitory, computer-readable medium having computer-executable instructions stored thereon that, when executed by a processor on a computer, cause the computer to perform a method comprising:

determining a network topology of a particular computer network and policy enforcement capabilities of particular devices within the network topology, wherein determining the policy enforcement capabilities includes determining one or more technical features of the particular devices, the one or more technical features including at least one technical feature selected from a group consisting of: virtual local area network (VLAN) enforcement; access control list (ACL) enforcement; and group-based policy enforcement for access control;

determining a logical framework of the particular computer network;

mapping access control and segmentation features of the particular devices to the logical framework based on the policy enforcement capabilities of the particular devices; and causing mapped access control and segmentation features to be implemented to enforce the logical framework within the network topology.

15. The tangible, non-transitory, computer-readable medium as in claim 14, wherein the logical framework is based on a model according to an IEC-62443 standard.

16. The tangible, non-transitory, computer-readable medium as in claim 14, wherein causing the access control and segmentation features to be implemented includes enforcing a zone and conduit model within the network topology.

17. The tangible, non-transitory, computer-readable medium as in claim 14, wherein determining the policy enforcement capabilities of the particular devices within the network topology includes determining one or more resources of the particular devices selected from a group consisting of: central processing unit processing capacity; memory; and ternary content-addressable memory.

18. An apparatus, comprising:

one or more network interfaces to communicate with a network;

a processor coupled to the one or more network interfaces and configured to execute one or more processes; and a memory configured to store a process that is executable by the processor, the process, when executed, configured to:

determine a network topology of a particular computer network and policy enforcement capabilities of particular devices within the network topology, wherein determining the policy enforcement capabilities includes determining one or more technical features of the particular devices, the one or more technical features including at least one technical feature selected from a group consisting of: virtual local area network (VLAN) enforcement; access control list (ACL) enforcement; and group-based policy enforcement for access control;

determine a logical framework of the particular computer network;

map access control and segmentation features of the particular devices to the logical framework based on the policy enforcement capabilities of the particular devices; and cause mapped access control and segmentation features to be implemented to enforce the logical framework within the network topology.

* * * * *